Inventor
Donald W. Goodwin
by
Attorney

Patented Nov. 13, 1945

2,388,841

UNITED STATES PATENT OFFICE 2,388,841

CONTROLLED SWIVEL JOINT

Donald W. Goodwin, Brea, Calif., assignor to Chiksan Tool Company, Brea, Calif., a corporation of California Application September 15, 1943, Serial No. 502,470

5 Claims. (Cl. 285—97.3)

This invention has to do with a controlled swivel joint, an object of the invention being to provide a swivel joint or connection for fluid conduits embodying means offering a predetermined resistance to rotation.

Swivel joints or swivel connections are provided in fluid conduits for various purposes. In many instances it is desired that such joints operate freely. However, there are occasions when it is desired that the joints embody satisfactory or dependable bearing connections for rotation but at the same time offer some resistance to rotation. Constructions have been provided for swivel connections wherein resistance to rotation occurs in or through the packing employed to make the connection tight. This type of construction is not satisfactory in that the resistance varies as the packing wears or deteriorates.

It is a general object of my invention to provide a swivel connection for fluid conduits wherein there is a friction means or drag means operating to exert a constant predetermined resistance to rotation without in any way interfering with the action of the other parts of the joint. By my present invention I provide a friction means entirely independent of the packing means so that the action of the packing means is not interfered with and so that the friction means remains constant and is not in any way influenced by the efficiency of the packing means.

Another object of my invention is to provide a swivel connection for conduits wherein there is a friction means exerting a predetermined drag on the joint retarding rotation or preventing free rotation, which means does not in any way interfere with the action of the bearing construction provided in the joint. By my invention I provide a friction means which acts radially and thus does not in any way exert axial thrust to interfere with the bearing means or to influence the action of the packing means, as might occur in the case of shifting or tending to shift the parts of the joint axially relative to each other.

Another object of my invention is to provide a swivel connection for fluid conduits wherein there is a friction means resisting free rotation of the parts, which means is located entirely within the joint so it is protected against foreign matter and against injury.

Figure 1:
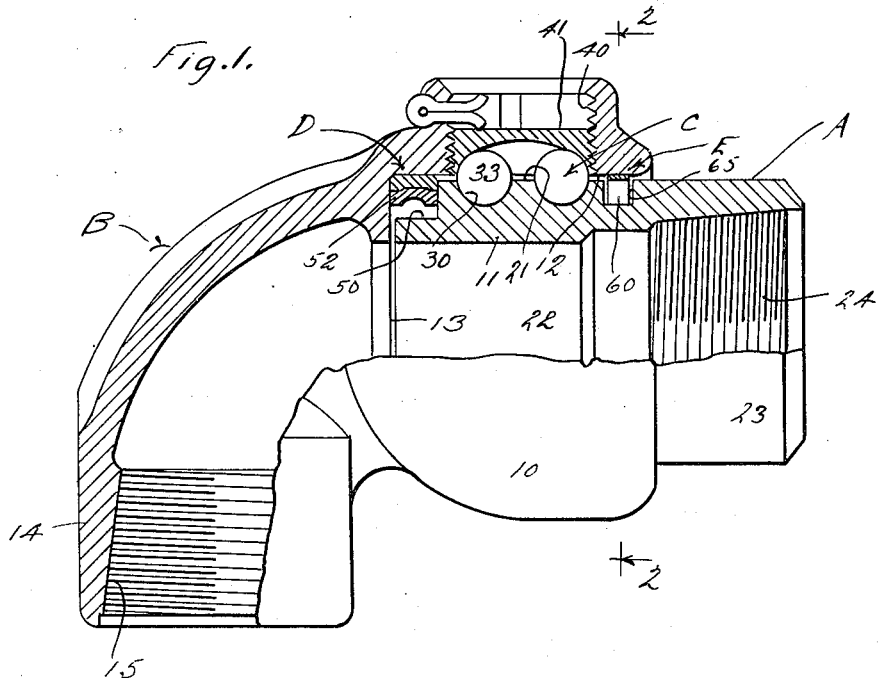
Figure 2:
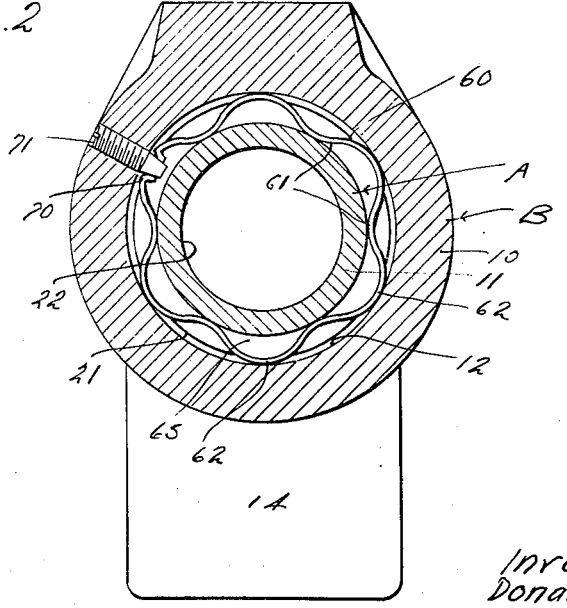

The various objects and features of my invention will be fully understood from the following detailed description of a typical preferred form and application of my invention, throughout which description reference is made to the accompanying drawing, in which:

Fig. 1 is a side elevation of a joint embodying the construction of the present invention with parts broken away to show in section, and Fig. 2 is a detailed transverse sectional view taken as indicated by line 2—2 on Fig. 1.

My present invention is designed to be used in connection with swivel joints, generally, and in practice its details may vary with the particular joint construction to which it is applied. In the drawing I have illustrated a simple, typical type of swivel joint and in this case the invention is shown in combination with a bearing means which support rotatably connects the parts of the joint, and a packing means which seals the parts against leakage at the joint.

The swivel connection illustrated includes, generally, a male section A, a female section B, bearing means C rotatably connecting the sections, packing means D sealing between the sections and friction means E normally frictionally resisting rotation between the parts of the joint.

In the particular joint illustrated the female section B has a body 10 in the form of a shell which receives the spindle portion 11 of the male section A. The body 10 has a recess formed in it from its outer or forward end, the recess being in the form of a bore 12 extending inwardly in the body and terminating at a shoulder 13. The female section is provided with a fluid connection 14 which, in the particular fitting illustrated, is disposed at right angles to the longitudinal axis of the joint and has a threaded part 15 to receive a fluid conduit or suitable fitting. The threaded part shown in the drawing is in the outer end portion of the fluid opening 16 that extends through the female section. It is to be understood that the connecting means might be in the form of an external thread or may be any suitable means for making connection with a conduit.

The male section A has a main or spindle part 11 which extends into and is carried within the body 10 of the female section B. The exterior 21 of the spindle is turned so that it fits with suitable working clearance in the bore 12 of the female section B. A fluid passage 22 is formed longitudinally through the spindle 11 and continues into a fluid connection 23 provided at the outer or projecting end of the male section A. The connection 23 like the connection 14 is shown internally threaded at 24 to receive a fitting or fluid conduit.

The bearing means provided for rotatably connecting the two sections A and B may be of any suitable construction. In the case illustrated we have shown a simple, common connecting means wherein there are registering grooves 30 in the wall of the bore 12 and in the exterior of the spindle 11 and balls 33 are carried in the grooves. The balls serve to form an effective bearing and operate to prevent displacement of the male section from the female section. It is noted that in the particular case illustrated there are two sets of registering grooves so that there are two rows of balls 33. The balls may be arranged in operating position through an opening 40 provided in the exterior of the body 10 and may be retained in place by a plug 41 suitably arranged and retained in the opening 40.

In accordance with the preferred arrangement the packing means D and the friction means E are located in opposite directions axially from the bearing means C. This arrangement is shown in the drawing and in this case the packing means D is located at the inner end of the bore provided in the body 10 while the friction means E is located in the outer end portion of the bore in the body 10.

The sealing means D may, in practice, be any suitable sealing arrangement suitable for the use to which the joint is to be put. In the drawing I have shown a typical sealing construction wherein a groove 50 is provided in the inner end portion of the spindle 11 of the section A and packing rings 52 are provided in the groove 50 to act in the groove and seal with the inner end portion of the bore 12 and against the shoulder 13 at the inner end of the bore.

The friction means E provided by my invention may, in accordance with the broader features of the invention, be located at any suitable point in the construction. Primarily, I locate the friction means E so that it is within the joint construction to be protected and I locate it so that it does not in any way interfere with the action or construction of the other parts of the device.

In the case shown in the drawing the friction means E is located in the outer end portion of the bore 12 of the body 10, that is, it is located outward of the bearing means C.

In its preferred form the friction means E includes a shoe 60 designed to introduce friction into the joint and thus resist turning between the sections A and B. The shoe may vary considerably in design although in practice it is preferred to make it in the form of a spring ring formed or crimped so that it has parts 61 bearing inwardly against the section A and parts 62 bearing outwardly against the section B. Various arrangements may be provided for carrying the shoe 60 in the joint. For instance, either one or both of the sections may be grooved to carry the shoe. In the case illustrated a groove 65 is provided in the spindle 11 of section A at a point opposite the outer end portion of the bore 12 in section B. The groove 65 is made sufficiently wide to accommodate the shoe 60 and is made deep enough so that the shoe is carried so that its parts 61 and 62 have the desired pressure engagement with the sections A and B, respectively.

The ring-like spring shoe 60 may be preformed to have the desired bearing or frictional engagement with the parts and the construction may be such that this frictional engagement remains constant and may occur either at the inside or at the outside of the ring.

I may, if desired, provide means for varying the friction exerted by the shoe 60. In the particular form of the invention shown I split the ring-like shoe 60 so that it has two spaced ends 70 and I thread a set screw 71 in the body 10 to enter between the ends 70 of the shoe. The end portion of the set screw is tapered so that as the set screw is advanced or moved inwardly it pushes the ends of the shoe ring apart, thus increasing the frictional engagement of the shoe on the section A or in the bottom of the groove 65 provided in section A. It is to be noted that when the means just described is provided, that is, when there is a set screw 71 between the ends of the shoe 60 the shoe is locked against turning relative to the section B and all of the frictional engagement occurs between the bottom of the groove 65 and the parts 60 of the shoe.

It will be observed from the drawing that the friction means E is housed entirely within the body 10 so that it is protected and the shoe 60 is such as to act radially only and thus does not in any way exert axial pressure to interfere either with the bearing C or the packing D. The friction means E is extremely simple and inexpensive of construction and is such as to operate dependably over a long period of time and its action will not vary with variations in the bearing or in the packing means.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A swivel joint including a female section, a male section rotatable in the female section, coupling means holding the sections together, and friction means axially spaced from the coupling means resisting rotation between the sections including, a single spring member directly frictionally engaging both of the sections radially.

2. A swivel joint including a female section, a male section rotatable in the female section, means holding the sections together and friction means independent of the first mentioned means resisting rotation between the sections including, a member frictionally engaging one of the sections in a radial direction, and means accessible from the exterior of the joint for varying the frictional engagement of said member.

3. A swivel joint including a female section, a male section rotatable in the female section, and friction means resisting rotation between the sections including, a member frictionally engaging one of the sections in a radial direction, and screw means for varying the frictional engagement of said member.

4. A swivel joint including a female section, a male section rotatable in the female section, and friction means resisting rotation between the sections including, a member frictionally engaging one of the sections in a radial direction, the member being in the form of a split spring ring, and means for varying the frictional engagement of said member including a screw carried by the other section and engaged between the ends of the ring.

5. A swivel joint including a female section, a male section rotatable in the female section, and friction means resisting rotation between the sections including, a member frictionally engaging one of the sections in a radial direction, the member being in the form of a split spring ring carried in a groove provided in one of the sections and within the female section, and means for varying the frictional engagement of said member including a screw carried by the other section and engaged between the ends of the ring.

DONALD W. GOODWIN.